(12) United States Patent
Zheng

(10) Patent No.: US 9,785,460 B2
(45) Date of Patent: Oct. 10, 2017

(54) DYNAMIC VIRTUAL MACHINE SIZING

(71) Applicant: VMware, Inc., Palo Alto, CA (US)

(72) Inventor: Haoqiang Zheng, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 266 days.

(21) Appl. No.: 13/886,360

(22) Filed: May 3, 2013

(65) Prior Publication Data

US 2014/0331222 A1 Nov. 6, 2014

(51) Int. Cl.
*G06F 9/455* (2006.01)
*G06F 9/50* (2006.01)

(52) U.S. Cl.
CPC ........ *G06F 9/45558* (2013.01); *G06F 9/5077* (2013.01)

(58) Field of Classification Search
CPC .......................... G06F 9/45558; G06F 9/5077
USPC ...................................................... 718/1, 104
See application file for complete search history.

(56) References Cited

U.S. PATENT DOCUMENTS

| | | | |
|---|---|---|---|
| 7,433,951 B1 * | 10/2008 | Waldspurger | 709/226 |
| 7,765,543 B1 * | 7/2010 | Weissman et al. | 718/1 |
| 8,127,301 B1 * | 2/2012 | Waldspurger | G06F 9/45533 718/1 |
| 8,140,808 B2 * | 3/2012 | Rawson, III | 711/170 |
| 8,359,451 B2 * | 1/2013 | Chen et al. | 711/170 |
| 8,566,835 B2 * | 10/2013 | Wang et al. | 718/104 |
| 9,632,808 B2 * | 4/2017 | Zheng | G06F 9/45558 |
| 2011/0320682 A1 * | 12/2011 | McDougall | G06F 12/023 711/6 |
| 2012/0233435 A1 * | 9/2012 | Ben-Yehuda et al. | 711/170 |
| 2014/0082612 A1 * | 3/2014 | Breitgand | G06F 9/45533 718/1 |
| 2014/0143773 A1 * | 5/2014 | Ciano | G06F 8/60 718/1 |

OTHER PUBLICATIONS

VMware technical white paper on "Network I/O Latency on VMware vSPHERE 5", 2012, pp. 1-15. Online web address: "https://www.vmware.com/files/pdf/techpaper/network-io-latency-perf-vsphere5.pdf".*
Uhlig, Volkmar, et al. "Towards Scalable Multiprocessor Virtual Machines." Virtual Machine Research and Technology Symposium. 2004. pp. 1-14.*
Song, Xiang, et al. "Schedule processes, not VCPUs." Proceedings of the 4th Asia-Pacific Workshop on Systems. ACM, 2013. Pates 1-7.*

(Continued)

*Primary Examiner* — Benjamin Wu
*Assistant Examiner* — Willy W Huaracha

(57) ABSTRACT

A technique is described for managing processor (CPU) resources in a host having virtual machines (VMs) executed thereon. A target size of a VM is determined based on its demand and CPU entitlement. If the VM's current size exceeds the target size, the technique dynamically changes the size of a VM in the host by increasing or decreasing the number of virtual CPUs available to the VM. To "deactivate" virtual CPUs, a high-priority balloon thread is launched and pinned to one of the virtual CPUs targeted for deactivation, and the underlying hypervisor deschedules execution of the virtual CPU accordingly. To "activate" virtual CPUs and increase the number of virtual CPUs available to the VM, the launched balloon thread may be killed.

22 Claims, 5 Drawing Sheets

(56) References Cited

OTHER PUBLICATIONS

C.A. Waldspurger, "Memory Resource Management in Vmware ESX Server," In Proceedings of the 5th Symposium on OSDI, Boston, MA, Dec. 9-11, 2002, http://www.usenix.org/events/osdi02/tech/waldspurger.html, 15 pages.
Z. Mwaikambo, et al., "Linux Kernel Hotplug CPU Support," In Ottawa Linux Symposium, vol. Two, Ottawa, Ontario Canada, Jul. 21-24, 2004, 16 pages.
K. Adams and O. Agesen, "A Comparison of Software and Hardware Techniques for x86 Virtualization," Operating Systems Review, 40(5):Dec. 2-13, 2006, ISSN 0163-5980, 12 pages.
VMware Inc., "Determining and Changing the Rate of Timer Interrupts a Guest Operating System Requests," http://kb.vmware.com/kb/1005802, Updated: Jan. 25, 2011, 4 pages.
VMware Inc., "Performance Best Practices for VMware vSphere 5.0," http://www.vmware.com/pdf/Perf_Best_Practices_vSphere5.0.pdf, Revision: Aug. 22, 2011, 76 pages.
Uhlig V et al., "Towards Scalable Multiprocessor Virtual Machines," 3rd Virtual Machine Research and Technology Symposium, May 6-7, 2004, San Jose CA, USENIX Association, US, May 6, 2004, pp. 1-15.
European Search Report dated Jun. 23, 2016 in EP Application 14166764.2.
VMware: "Performance Best Practices for VMware vSphere 5.1," Oct. 21, 2012, Retrieved from the Internet: URL: https://web.archive.org/web/20121021054231/http://www.vmware.com/pdf/Perf_Best_Practices_vSphere5.1.pdf.

* cited by examiner

DYNAMIC VIRTUAL MACHINE SIZING

BACKGROUND

Virtual computing environments allow multiple virtual machine (VM) guests to be run on a single physical platform and to share physical resources. Some virtual computing environments allow configuring the VMs in a way where the total number of processors designated for use by the VMs is more than the actual number of physical processors available on the host. This is referred to as CPU over-commitment, and it allows packing more VMs onto a single host. Further, virtual machines can be allocated more than one virtual CPU, allowing users to run applications that spawn multiple processes or multi-threaded application. However, configuring a virtual machine with more virtual CPUs (vCPUs) than its workload can use increased resource usage due to overhead, thereby impacting performance on heavily loaded systems. Examples of this scenario include a single-threaded workload running in a multiple vCPU virtual machine or a multi-threaded workload in a virtual machine with more vCPU than the workload can effective use. Furthermore, virtual machines are allocated CPU resources (and memory resources) at the time of deployment of the virtual machines, and changing these allocations typically involves taking a virtual machine offline, reconfiguring settings, and bringing the virtual machine back online. This process can be time-consuming to system administrators and interrupts access to services on the virtual machines.

SUMMARY OF THE DISCLOSURE

Embodiments of the present disclosure provide a method for managing CPUs in a host having a virtual machine executing thereon. The virtual machine is allocated a plurality of virtual CPUs. The method includes determining a target number of virtual CPUs for a virtual machine based on processor demand by the virtual machine and that is in excess of a current number of virtual CPUs activated for the virtual machine. The method further includes launching a prioritized process thread in a guest operating system of the virtual machine. The prioritized process thread is associated with a first virtual CPU of the plurality of virtual CPUs and includes a halt instruction. The method includes executing, by operation of a guest scheduler in the guest operating system, the prioritized process thread using the first virtual CPU of the plurality of virtual CPUs. The method further includes, responsive to detecting, by operation of a hypervisor in the host, that the first virtual CPU is executing the halt instruction, descheduling execution of the first virtual CPU on one or more physical CPUs of the host.

It should be appreciated that aspects of present disclosure can be implemented in numerous ways, such as a process, an apparatus, a system, a device or a method on a computer readable medium. Several embodiments of the present disclosure are described below.

DETAILED DESCRIPTION

Figure 1:
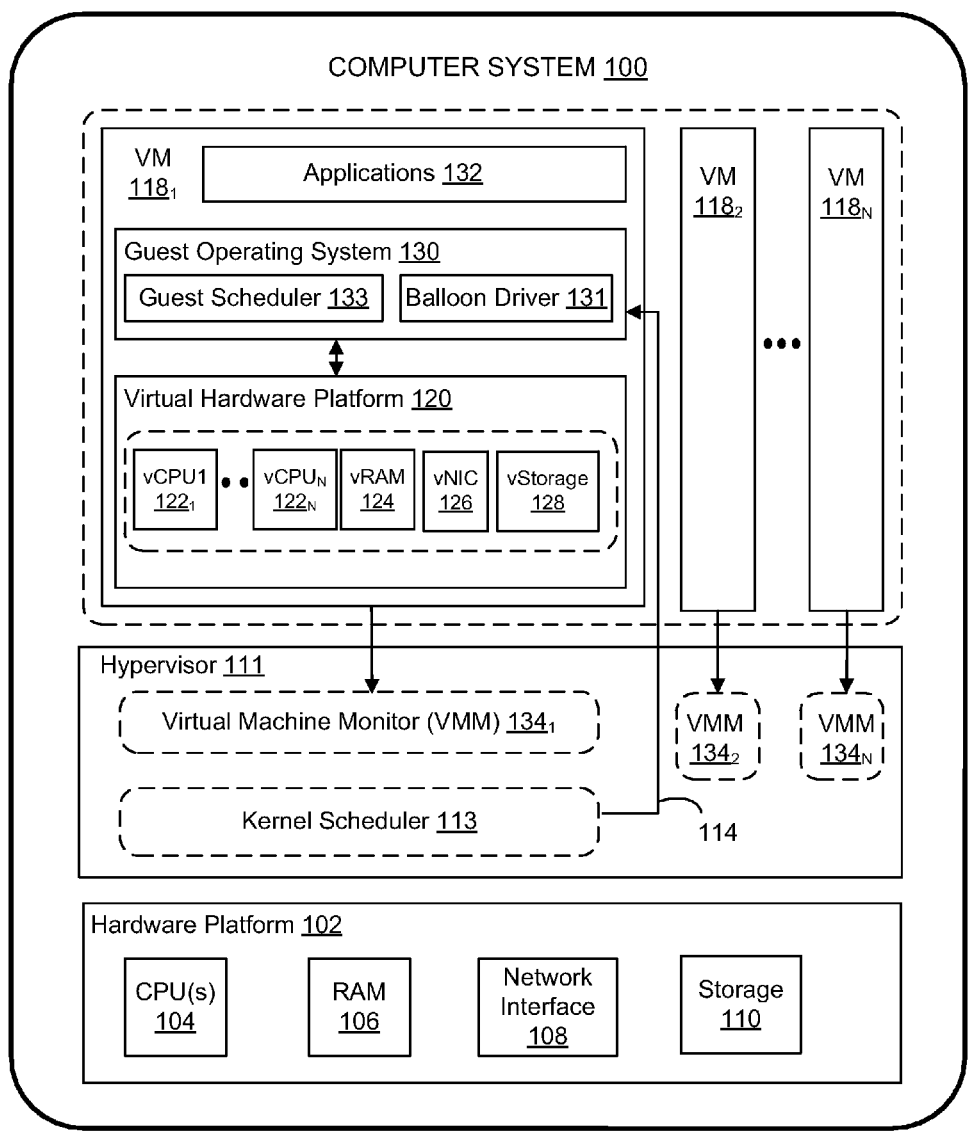
FIG. 1 is a block diagram that shows a virtualized computer architecture in which embodiments may be implemented.

FIG. 1 depicts a block diagram of a computer system 100 that is representative of a virtualized computer architecture in which embodiments may be implemented. As is illustrated, computer system 100 hosts multiple virtual machines (VMs) 118$_1$-118$_N$ that run on and share a common hardware platform 102. Hardware platform 102 includes conventional computer hardware components, such as one or more central processing units (CPUs) 104, random access memory (RAM) 106, one or more network interfaces 108, and a persistent storage 110.

A virtualization software layer, referred to herein after as hypervisor 111, is installed on top of hardware platform 102. Hypervisor 111 makes possible the concurrent instantiation and execution of one or more VMs 118$_1$-118$_N$. The interaction of a VM 118 with hypervisor 111 is facilitated by the virtual machine monitors (VMMs) 134. Each VMM 134$_1$-134$_N$ is assigned to and monitors a corresponding VM 118$_1$-118$_N$. In one embodiment, hypervisor 111 may be VMkernel™ which is implemented as a commercial product in VMware's vSphere® virtualization product, available from VMware™ Inc. of Palo Alto, Calif. In an alternative embodiment, a host operating system is installed between hypervisor 111 and hardware platform 102. In such an embodiment, hypervisor 111 operates above an abstraction level provided by the host operating system.

After instantiation, each VM 118$_1$-118$_N$ encapsulates a physical computing machine platform that is executed under the control of hypervisor 111. Virtual devices of a VM 118 are embodied in the virtual hardware platform 120, which is comprised of, but not limited to, one or more virtual CPUs (vCPUs) 122$_1$-122$_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as Microsoft Windows, Linux, and the like.

In the embodiment shown in FIG. 1, guest OS 130 includes a scheduler component (depicted as guest scheduler 133) to support multitasking, which is a method by which multiple computing tasks, referred to as processes, are performed during a same period of time and share common processing resources. Guest scheduler 133 is configured to schedule and dispatch multiple processes that execute and access computer resources (e.g., vCPUs 122) concurrently using a variety of algorithms (e.g., round-robin, first-in-first-out, pre-emptive scheduling, etc.). For example, guest scheduler 133 may manage access to a vCPU 122 by taking into account process priority, such that processes having a higher execution priority are allowed more time than processes having a lower priority. In another example, In multiprocessor environments (e.g., a VM having a plurality of vCPUs 122), guest scheduler 133 may dispatch processes to vCPUs 122 that are less busy than other vCPUs As mentioned above, a VM 118 running within computer system 100 can be configured to have one to many vCPUs $122_1$-$122_N$ (a VM having N vCPUs is sometimes referred to as an N-way virtual machine). For sake of discussion, a "large" virtual machine as used herein refers to a virtual machine having many vCPUs, and a "small" virtual machine as used herein refers to a virtual machine having few vCPUs. In one implementation, a VM 118 may be configured to have up to 64 vCPUs. However, in some cases, VMs 118 that have many vCPUs 122 may operate less efficiently than VMs 118 that have few vCPUs 122 in terms of utilization, throughput, and other performance metrics of the underlying physical CPUs 104. A number of factors may contribute to the inefficiency of large N-way VMs. Unused vCPUs still continue to consume timer interrupts in some guest operating systems. Guest scheduler 133 might unnecessarily migrate a single-threaded workload amongst multiple vCPUs, thereby losing cache locality. Guest OS 130 may execute an idle loop during periods of inactivity, which results in consumption of resources that would otherwise be available for other uses. Maintaining a consistent view of virtual memory for all vCPUs running in a VM can consume additional resources, both in guest OS 130 and in underlying hypervisor 111. Because of such issues, system administrators may be reluctant to provision more than a 2-way VM, even though modern computer applications are getting more demanding and increasingly require large virtual machines. This VM sizing problem gives rise to a conflict between VM efficiency (e.g., giving the user a 8-way VM will cause efficiency issues) and VM functionality (e.g., giving the user a 2-way VM precludes use of demanding high-end applications that need large VMs). Accordingly, embodiments of the present disclosure provide a technique, referred to herein as CPU ballooning, that dynamically "de-activates" vCPUs that are not needed by a VM. This provides for large N-way virtual machines without incurring the efficiency costs of running a virtual machine with a large number of virtual CPUs.

Embodiments of the present disclosure provide a method or system known as CPU ballooning for managing CPU resources in a host having a virtual machine executing thereon. FIG. 1 depicts a balloon driver 131, which is installed under guest OS 130. In one embodiment, balloon driver 131 is a device driver executing under guest OS 130. In some embodiments, balloon driver 131 executes periodically; that is, balloon driver 131 remains in an idle state until triggered by a timer event. After executing, balloon driver 131 goes back into an idle state until triggered again by another timer event. The frequency of the timer events may be configured by an administrator. Balloon driver 131 obtains information from kernel scheduler 113 to adjust the number of vCPUs 122 that are available for use by VM 118. Balloon driver 131 is configured to maintain a count of a current number of vCPUs activated for VM 118. For example, upon initial startup of a VM (e.g., VM $118_1$), balloon driver 131 sets the count of a current number of vCPUs to be equal to the number of vCPUs allocated to VM $118_1$, and increments and decrements the count accordingly during operations described below.

As further shown in FIG. 1, kernel scheduler 113 is a component of hypervisor 111. Kernel scheduler 113 is responsible for allocating physical CPU 104 among the various processes running on computer system 100 at a given time, wherein a process, as used here, is an executing computer program. For example, kernel scheduler 113 may determine what processes should be run on CPU 104 (or on any of a number of CPUs in a multiprocessor complex), the order in which such processes shall run, and what running processes should be preempted by a process having higher priority. To make its scheduling decisions, kernel scheduler 113 may use specific data, including: the set of processes that are ready to run; the respective priorities of currently running processes; and the set of processes that are currently waiting for one or more system resources.

In addition to managing access to physical CPU 104, kernel scheduler 113, in embodiments described herein, is configured to determine a target vCPU size, which is a target number of vCPUs 122 that a particular VM 118 should use at a given point in time. This target vCPU size is communicated to balloon driver 131 of guest OS 130, for example, using calls to a backdoor interface (depicted by directional line 114). Balloon driver 131 then uses this recommendation to adjust the number of vCPUs 122 that guest scheduler 133 dispatches processes on, as described in greater detail below. For example, if the vCPUs 122 that VM 118 has at its disposal are not fully utilized, balloon driver 131 will decrease the number of vCPUs 122 available for use by VM 118. By contrast, if kernel scheduler 113 provides a target vCPU size for VM 118 that exceeds the number of vCPUs used by VM 118, then balloon driver 131 will attempt to increase the number of vCPUs 122 available for use by VM 118.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134.

Figure 2:
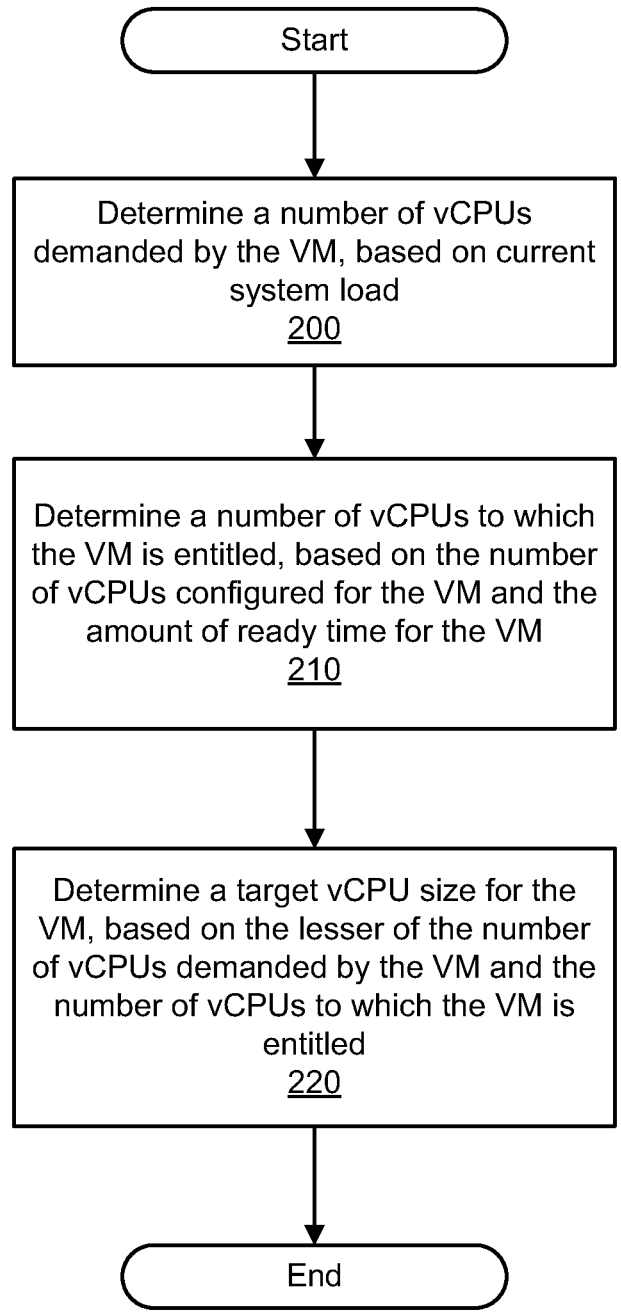
FIG. 2 is a flow diagram that illustrates the steps carried out by a virtualization layer for determining a target virtual CPU size for a virtual machine.

FIG. 2 is a flow diagram that depicts the steps taken by kernel scheduler 113 in determining the target vCPU size for a particular VM. As shown in FIG. 2, at step 200, a number of vCPUs demanded by the VM is determined based on the current system load of computer system 100. In one embodiment, kernel scheduler 113 determines a demanded number of vCPUs as shown in Equation 1:

$$\text{demanded}_{vcpus} = \lceil \text{demand}_{VM} / \text{expectedUtilRatio}_{VM} \rceil \quad (1)$$

The demanded number of vCPUs (i.e., $\text{demanded}_{vcpus}$) is based on: (1) the total demand of all vCPUs 122 associated with a VM 118 (i.e., $\text{demand}_{VM}$); and (2) the expected utilization ratio of all vCPUs 122 associated with a VM 118 (i.e., $\text{expectedUtilRatio}_{VM}$).

In one embodiment, a vCPU's demand is the amount of time the vCPU can consume if there's no "stolen" time. A vCPU's stolen time includes ready time, overlap cycles, time loss to power management, time stolen by Hyperthreading, and other variables. Ready time is the amount of time that the vCPU is runnable, but not getting scheduled to run on a physical CPU because the system is busy with running other vCPUs. Overlaps cycles are the amount of time stolen by interrupts and bottom halves (BHs) that preempted execution of this vCPU. Lost time due to power management represents efficiency loss because of frequency scaling. For example, if the frequency is dropped to 20 percent of the nominal frequency, 80 percent of the CPU is considered stolen. Time loss to hyper-threading represents time stolen by workloads running on a partner physical CPU.

A vCPU's demand may be estimated based on the amount of cycles actually used and the amount of cycles the vCPU would have used if there were no "stolen" cycles. According to one embodiment, the total demand of a vCPU associated with VM 118 (i.e., demand$_{VM}$) is calculated as in Equation 2:

$$\text{demand}_{vcpu} = \text{CyclesUsed}_{vcpu} + \text{CyclesStolen}_{vcpu} * \text{CyclesCapacity}_{vcpu} \qquad (2)$$

As Equation 2 shows, the demand of a vCPU 122 is based on: (1) the percentage of cycles used by the vCPU 122 executing within VM 118 in a given time period (i.e., CyclesUsed$_{vcpu}$); (2) the percentage of cycles "stolen" from the vCPU 122 executing within VM 118 in a given time period (i.e., CyclesStolen$_{vcpu}$); and (3) the percentage of cycles that a vCPU 122 has the capacity to run in the same time period (i.e., CyclesCapacity$_{vcpu}$). The cycles used by a vCPU 122 are those cycles in which that vCPU 122 executes instructions. By contrast, cycles stolen from a vCPU 122 are those cycles where that vCPU 122 has instructions to execute, but is preempted from executing those instructions due to, for example, system load. Examples of stolen cycles include cycles where a vCPU 122 was ready to run, but was not dispatched due to computer system 100 running the processes of other VMs, and cycles where a vCPU 122 is preempted by computer system 100 handling external interrupts. Finally, the capacity of a vCPU 122 (i.e., CyclesCapacity$_{vcpu}$) is the percentage of cycles that a vCPU 122 has the ability to consume over a given time period if there are no "stolen" cycles. Furthermore, the demand of VM 118 (i.e., demand$_{VM}$) is the sum of the demands of the vCPUs 122 executing within VM 118.

As shown in Equation 2, the percentage of used cycles (CyclesUsed$_{vcpu}$) is added to the product of the percentage of stolen cycles (CyclesStolen$_{vcpu}$) of a vCPU 122 and the vCPU's capacity (CycleCapacity$_{vcpu}$) over a given time period, the result of which is used as the current demand of the vCPU (demand$_{vcpu}$). For example, if the percentage of cycles used by the vCPUs 122 executing within VM 118 over a given time period is 30, the percentage of cycles stolen from the vCPUs 122 over a given time period is 50, and the capacity of a single vCPU 122 is 40 percent over that same time period, the current demand of vCPU 122 would be 30+50*40%, which is equal to 50 percent.

The expected utilization ratio (i.e., expectedUtilRatio$_{VM}$) is a value that is configurable for each VM that is instantiated by hypervisor 111 and represents, in percentage terms, a rate of utilization that the vCPUs 122 of VM 118 should have and still provide acceptable performance. The expected utilization ratio may be set at the time VM 118 is configured by an administrator, and may be altered during the execution of VM 118. For example, the expected utilization ratio may be configured as 70% based on a determination that applications running in the VM may continue to operate well when system utilization is 70% or less.

Once the current demand on VM 118 (demand$_{VM}$) and the expected utilization ratio of VM 118 (expectedUtilRatio$_{VM}$) have been determined, kernel scheduler 113 then computes the number of demanded vCPUs 122 (i.e., demanded$_{vcpus}$) as in Equation 1. For example, if VM 118 has a current demand of 110% and an expected utilization ratio of 70%, then its demanded number of vCPUs 122 will be 2 (because $\lceil 110/70 \rceil = 2$).

At step 210, kernel scheduler 113 determines a number of vCPU to which the given VM is entitled based on the number of vCPUs configured for the VM and the amount of ready time for the vCPUs. A given VM's effective CPU resource entitlement may be smaller than its demand, for example, in cases when the system running the VM is over-committed, or in cases where the VM's resource allocation is small, or both. As such, it has been determined that it may be more efficient to run the VM with less vCPUs for such cases. In one embodiment, the kernel scheduler 113 determines a reduced number of vCPUs for the VM such that the remaining vCPUs have less ready time, thereby executing more efficiently.

In one embodiment, kernel scheduler 113 determines an effective number of vCPUs to which VM 118 is entitled (i.e., entitled$_{vcpus}$) according to Equation 3 set forth below:

$$\text{entitled}_{vcpus} = \text{num}_{vcpus} - \lfloor \text{ready} \rfloor. \qquad (3)$$

In some embodiments, kernel scheduler 113 determines the number of vCPUs 122 that VM 118 is entitled to (i.e., entitled$_{vcpus}$) by first recording the number of vCPUs 122 defined for VM 118 (i.e., num$_{vcpus}$), which is set at the time VM 118 is configured. Kernel scheduler 113 then determines the amount of ready time for all vCPUs for the VM. As mentioned above, the ready time is the amount of time a VM wants to run but has not been provided physical CPU resources on which to execute. In one embodiment, ready time may be represented in a percentage format, for example, a VM having a ready time of 5% (or 0.05) means that the VM spent 5% of its last sample period waiting for available CPU resources. As such, in one example, if an 8-way VM spent 200 percent of the time on the READY state, then the number of entitled vCPUs is 6 (because $8 - \lfloor 2.00 \rfloor = 6$).

At step 220, kernel scheduler 113 determines a target vCPU size (i.e., target$_{vcpus}$) for a particular VM 118 based on the lesser of the demanded number of vCPUs (demanded$_{vcpus}$, calculated in Equation 1) and the entitled number of vCPUs for the particular VM (entitled$_{vcpus}$, calculated in Equation 3), as set forth in Equation 4:

$$\text{target}_{vcpus} = \min(\text{demanded}_{vcpus}, \text{entitled}_{vcpus}) \qquad (4)$$

Figure 3:
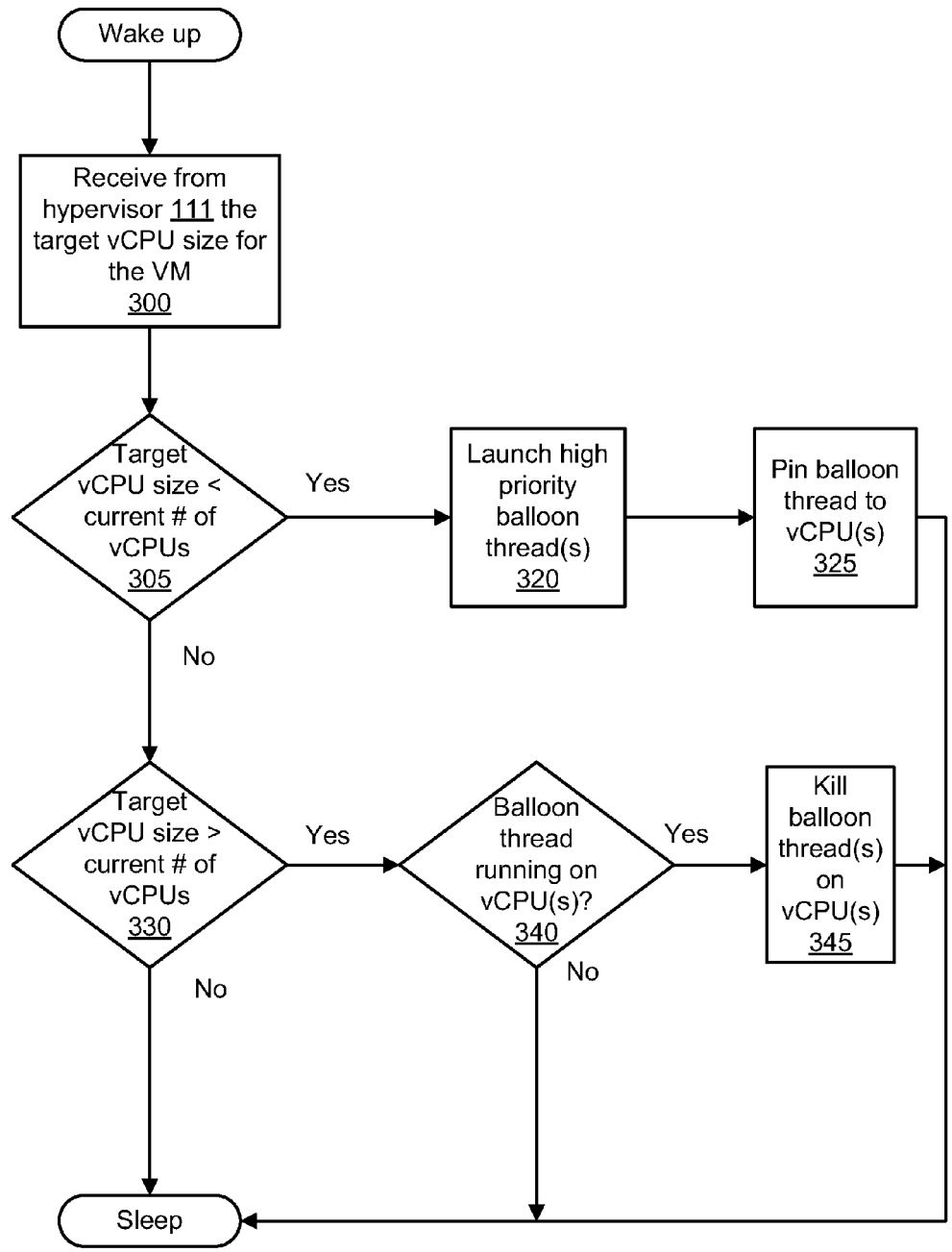
FIG. 3 is a flow diagram that illustrates the steps carried out by a balloon driver to implement a target virtual CPU size for a virtual machine in response to receiving a target virtual CPU size from a kernel scheduler.

FIG. 3 is a flow diagram that illustrates the steps carried out by balloon driver 131 during one of its periodic execution cycles. First, balloon driver 131 "wakes up" after being triggered by a timer event. At step 300, balloon driver 131 communicates with hypervisor 111 (specifically, with kernel scheduler 113) and receives a target vCPU size that kernel scheduler 113 calculates for VM 118. This target vCPU size represents the number of vCPUs 122 that, in the estimation of kernel scheduler 113, VM 118 should use in its virtual hardware platform 120. Next, at step 305, balloon driver 131 compares this target vCPU size to the number of vCPUs 122 that VM 118 is currently using. If the number of vCPUs 122 that VM 118 is currently using exceeds the target vCPU size, then, at step 320, balloon driver 131 launches one or more balloon threads based on the received target vCPU size. In step 325, balloon driver 131 specifies one or more vCPUs 122 that balloon thread(s) will run on (i.e., balloon driver 131 "pins" thread(s) to vCPU(s) 122). Each balloon thread is then pinned to one vCPU 122.

In one embodiment, a balloon thread is a thread configured to occupy a particular vCPU (e.g., vCPU$_1$) such that guest scheduler 133 of guest OS 130 perceives vCPU 122$_1$ as unavailable for scheduling purpose. In some embodiments, a balloon thread is a prioritized process thread having a high process priority relative to other processing executing within guest OS 130 such that guest scheduler 133 may not preempt, or interrupt, execution of the balloon thread on a particular vCPU. In some implementations, a balloon thread may be a kernel thread, a lightweight process (LWP), or other process executing within guest OS 130. Balloon driver 131 may further configure the balloon thread to be "pinned" to a vCPU targeted for de-activation. For example, balloon driver 131 may set a processor affinity setting on the balloon thread that signals to guest scheduler 133 that the balloon thread should be bound to a particular vCPU. Balloon threads are configured to remain in execution until terminated.

In one embodiment, a balloon thread may be further configured to execute an idle instructions to communicate to hypervisor 111 that the particular vCPU 122 to which the balloon thread is pinned should be descheduled. Therefore, hypervisor 111 will not incur the overhead of maintaining that particular vCPU 122. In one particular embodiment, a balloon thread may have computer instructions that halts a processing unit (e.g., vCPU 122) until more work needs to be done, and enters a halted (or ready state). An example implementation of a balloon thread for an x86 computer architecture is shown as pseudo-code in Table 1 below.

TABLE 1

Sample pseudo-code of balloon thread

```
while (1) {
    HLT;
}
```

As shown, the balloon thread may be implemented as a loop that repeatedly issues a HLT instruction, an assembly language instruction that halts a processing unit until more work needs to be done (e.g., in an interrupt-driven processor, until a next external interrupt is fired). In other embodiments, the balloon thread may include a sleep mode, MONITOR, MWAIT, or other functionally equivalent instructions. In some embodiments, hypervisor 111 is configured to detect when any guest processes running on VMs 118 that are executing idle instructions and to deschedule any vCPUs on which an idle instruction is executing from running on a physical CPU. In these embodiments, a HLT instruction in the balloon thread serves to communicate to kernel scheduler 113 of hypervisor 111 that the particular vCPU 122 running the balloon thread may be descheduled. As such, from the perspective of guest scheduler 133, the launched balloon thread is a high priority thread that does not yield the vCPU. Meanwhile, from the perspective of kernel scheduler 113, the vCPU is halted by the idle loop of the balloon thread and may be descheduled from the physical CPUs.

In one embodiment, balloon driver 131 launches a number of balloon threads to satisfy the difference in the target number of vCPUs and current number of vCPUs. After launching and pinning each balloon thread, balloon driver updates the count of the current number of vCPUs activated for the virtual machine. For example, balloon driver 131 may decrement the count of the current number of virtual CPUs activated for the VM for each balloon thread launched.

At step 300, if balloon driver 131 receives a target number of vCPUs 122 from kernel scheduler 113 that exceeds the number of vCPUs 122 currently used by VM 118, at step 340, balloon driver 131 determines whether a previously launched balloon thread was pinned to one of the vCPUs 122. If such a balloon thread was launched, and is currently running on a vCPU 122, at step 345, balloon driver 131 kills execution of the balloon thread in guest OS 130. From the standpoint of guest scheduler 133, this will free that vCPU 122 for scheduling other processes. Further, balloon driver 131 kills execution of as many balloon threads as possible in order to free additional vCPUs 122 for process scheduling. In one embodiment, responsive to killing a balloon thread, balloon driver updates the count of the current number of vCPUs activated for the virtual machine. For example, balloon driver 131 may increment the count of the current number of virtual CPUs activated for the VM for each balloon thread killed.

After performing the aforementioned steps, balloon driver 131 goes back into an idle state (or "sleeps") until triggered again by a timer interrupt.

Figure 4A:
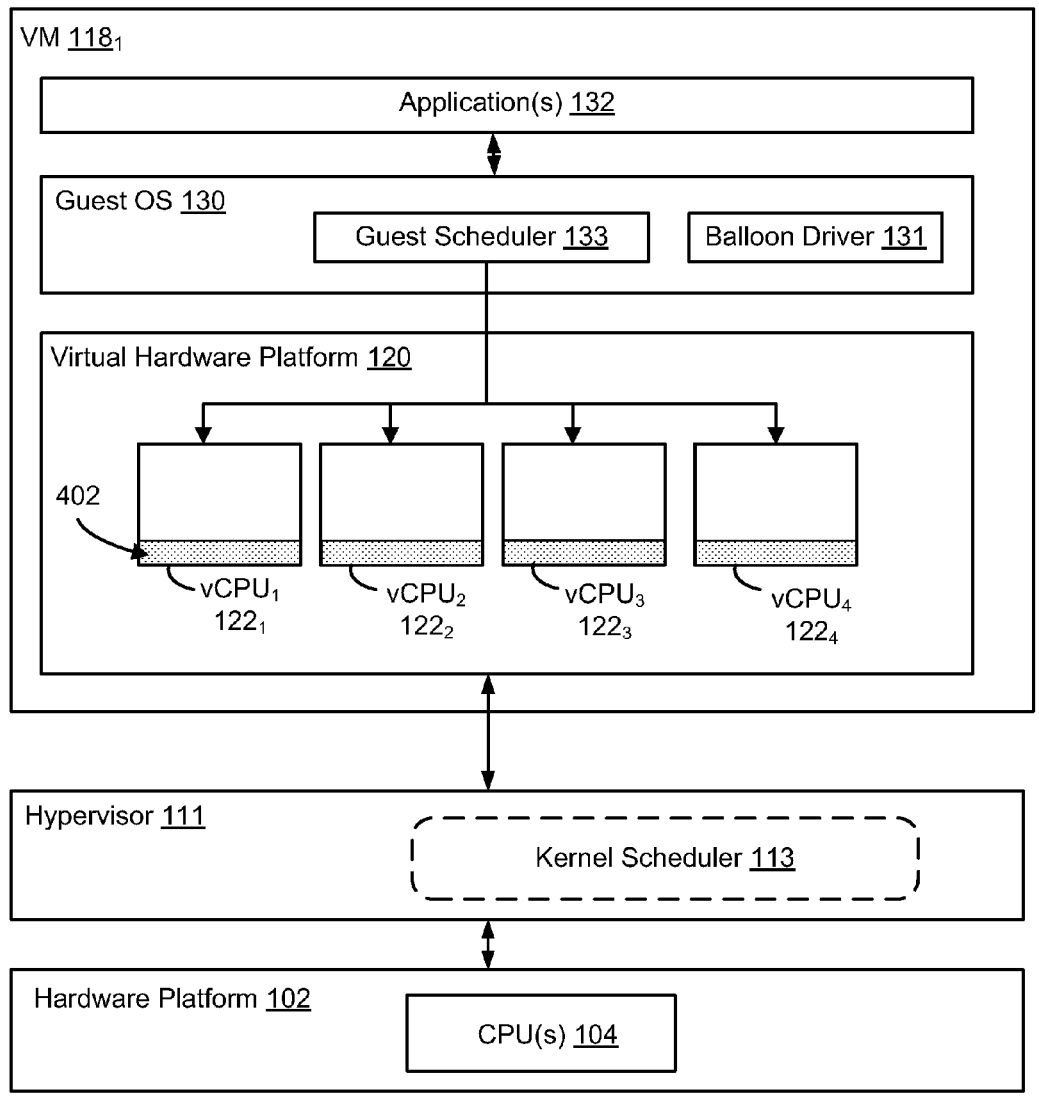
FIG. 4A is a block diagram that illustrates dispatching of threads to virtual CPUs by a guest scheduler of a virtual machine where the virtual CPU size is the same as a target virtual CPU size received from a kernel scheduler.

FIG. 4A is a block diagram of VM $118_1$ having four allocated vCPUs $122_1$-$122_4$, on which processes that are scheduled and dispatched on by guest scheduler 133. Guest scheduler 133 of guest OS 130 allocates time on one or more vCPUs $122_1$-$122_N$ to processes (or threads) for executing computer instructions. Region 402 depicted in FIG. 4A represents an amount of demand associated with each vCPU, as a portion of time spent by each vCPU executing instructions. In the example shown, load balancing among the plurality of vCPUs is performed by guest scheduler 133, yielding similar amounts of demand on each vCPU, though it should be recognized that vCPUs may have varying amounts of demand and cycles used for executing processes and threads.

Figure 4B:
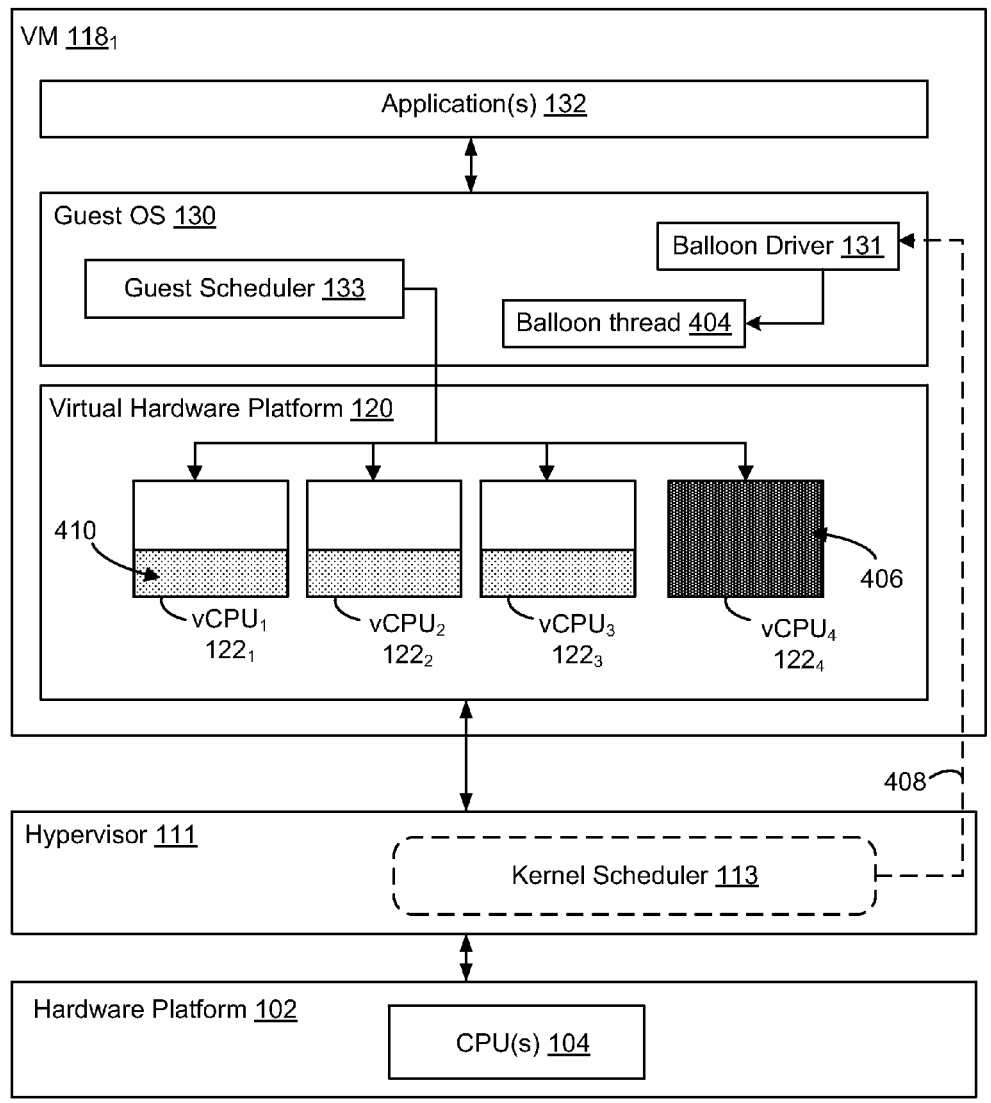
FIG. 4B is a block diagram that illustrates a guest scheduler of a virtual machine dispatching threads to a plurality of virtual CPUs and a balloon thread to one virtual CPU where the virtual CPU size exceeds a target virtual CPU size received from a kernel scheduler.

FIG. 4B is a block diagram of VM $118_1$ having four vCPUs $122_1$-$122_4$ on which processes are scheduled and dispatched to one or more by guest scheduler 133 when balloon driver 131 has determined that VM $118_1$ is utilizing more vCPUs 122 than a target number of vCPUs 122 recommended by hypervisor 111. In this illustration, balloon driver 131 communicates with hypervisor 111 (e.g., via backdoor call) as depicted by line 408, and receives a target number of vCPUs 122 that VM $118_1$ should utilize. Balloon driver 131 compares this target number of vCPUs 122 to the current number of vCPUs 122 that are activated and available for use by VM $118_1$. Balloon driver 131 launches one or more balloon threads 404 if the current number of vCPUs 122 in use exceeds the target number of vCPUs 122. In the example shown, balloon driver 131 determines that the target number of vCPUs for the VM is three vCPUs, which is in excess of the current number of vCPUs (e.g., four, as initially allocated), and launches one balloon thread 404.

Balloon driver 131 specifies that a processor affinity of balloon thread 404 to a particular vCPU targeted for de-activation (e.g., vCPU $122_4$), thereby pinning the balloon thread to the vCPU. Further, balloon thread 404 may be a kernel thread having a high priority relative to other processes and threads running on guest OS 130, thus preempting all other processes on the particular vCPU $122_4$. Thus, guest scheduler 133 dispatches balloon thread 404 on vCPU $122_4$ with the specified priority. It should be recognized that, in some embodiments, guest scheduler 133 may not dispatch other processes on $vCPU_4$. The occupation of vCPU $122_4$ by balloon thread 404, whereby balloon thread 404 utilizes all of the CPU cycles of vCPU $122_4$, is depicted in FIG. 4B by the region 406. Guest scheduler 133 dispatched and re-schedules processes and threads, including those processes and threads formerly executing on vCPU $122_4$ on the remaining available vCPUs $122_1$-$122_3$. Regions 410 depicted in FIG. 4B represent increased demand on each vCPUs $122_1$, $122_2$, $122_3$ as a result of vCPU 1224 no longer being available. Accordingly, embodiments of the present disclosure effectively have de-activated a vCPU based on demand, without having to shutdown or bring offline a VM.

Although one or more embodiments have been described herein in some detail for clarity of understanding, it should be recognized that certain changes and modifications may be made without departing from the spirit of the disclosure. For example, in some embodiments, guest operating system 130 may be configured to support dynamic CPU onlining and offlining. In such embodiments, rather than launch balloon threads, balloon driver 131 may be configured to adjust the number of vCPUs for the VM within guest OS 130. In one implementation, balloon driver 131 may adjust the number of vCPUs for a VM running a Linux guest operating system be writing the target vCPU size to a device driver filesystem (e.g., sysfs), such as a change to a /sys/devices/system/cpu/cupid/online sys node.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method carried out by a driver of a virtual machine executing in a host having a hypervisor that manages scheduling of a plurality of virtual CPUs of the virtual machine to execute on physical CPUs of the host and descheduling of the plurality of virtual CPUs of the virtual machine from executing on the physical CPUs of the host, the method comprising:

receiving a determination from the hypervisor, of a target number of virtual CPUs for the virtual machine;

determining whether the target number of virtual CPUs is less than a current number of virtual CPUs activated for the virtual machine; and responsive to a determination that the target number of virtual CPUs is less than the current number of virtual CPUs activated for the virtual machine, launching, in a guest operating system of the virtual machine, and for execution in a first virtual CPU of the plurality of virtual CPUs, a prioritized process thread that includes a halt instruction, pinning the prioritized process thread to the first virtual CPU, to bind the prioritized process thread to the first virtual CPU, causing a guest scheduler in the guest operating system to execute the prioritized process thread using the first virtual CPU of the plurality of virtual CPUs, and decrementing the current number of virtual CPUs activated for the virtual machine, wherein, in response to detection by the hypervisor that the first virtual CPU is executing the halt instruction, the hypervisor deactivates the first virtual CPU from executing in the virtual machine by descheduling the first virtual CPU from executing on one or more physical CPUs of the host.

2. The method of claim 1, wherein the prioritized process thread is a kernel thread.

3. The method of claim 2, wherein the halt instruction executes within a loop that repeatedly issues the halt instruction.

4. The method of claim 1, further comprising:
responsive to a determination that the target number of virtual CPUs is greater than the current number of virtual CPUs, killing execution of the prioritized process thread in the first virtual CPU,
wherein, in response to a determination that the first virtual CPU is no longer executing the prioritized process thread, the hypervisor activates the first virtual CPU.

5. The method of claim 1, wherein the hypervisor identifies the first virtual CPU as a virtual CPU to be deactivated based on a current system load.

6. The method of claim 5, wherein the determination by the hypervisor of the target number is based on a total demand for the plurality of virtual CPUs allocated to the virtual machine and on an expected utilization ratio for the virtual machine.

7. The method of claim 5, wherein the determination by the hypervisor of the target number is further based on a number of virtual CPUs to which the virtual machine is entitled and on an amount of ready time associated with the virtual machine.

8. The method of claim 1, wherein the determination of the target number of virtual CPUs for the virtual machine is received from the hypervisor via a backdoor call.

9. A non-transitory computer readable storage medium having stored thereon computer readable program code of a driver of a virtual machine executing in a host having a hypervisor that manages scheduling of a plurality of virtual CPUs of the virtual machine to execute on physical CPUs of the host and descheduling of the plurality of virtual CPUs of the virtual machine from executing on the physical CPUs of the host, wherein the computer readable program code comprises:
computer readable program code executed to receive a determination from the hypervisor of a target number of virtual CPUs for the virtual machine;
computer readable program code executed to determine whether the target number of virtual CPUs is less than a current number of virtual CPUs activated for the virtual machine; and
computer readable program code executed responsive to a determination that the target number of virtual CPUs is less than the current number of virtual CPUs activated for the virtual machine,
to launch, in a guest operating system of the virtual machine, and for execution in a first virtual CPU of the plurality of virtual CPUs, a prioritized process thread that includes a halt instruction,
to pin the prioritized process thread to the first virtual CPU, to bind the prioritized process thread to the first virtual CPU,
to cause a guest scheduler in the guest operating system to execute the prioritized process thread using the first virtual CPU of the plurality of virtual CPUs, and
to decrement the current number of virtual CPUs activated for the virtual machine,
wherein, in response to detection by the hypervisor that the first virtual CPU is executing the halt instruction, the hypervisor deactivates the first virtual CPU from executing in the virtual machine by descheduling the first virtual CPU from executing on one or more physical CPUs of the host.

10. The non-transitory computer readable storage medium of claim 9, wherein the prioritized process thread is a kernel thread.

11. The non-transitory computer readable storage medium of claim 9, wherein the computer readable program code further comprises:
computer readable program code executed responsive to a determination that the target number of virtual CPUs is greater than the current number of virtual CPUs, to kill execution of the prioritized process thread in the first virtual CPU,
wherein, in response to a determination that the first virtual CPU is no longer executing the prioritized process thread, the hypervisor activates the first virtual CPU.

12. The non-transitory computer readable storage medium of claim 9, wherein
the hypervisor identifies the first virtual CPU as a virtual CPU to be deactivated based on a current system load.

13. The non-transitory computer readable storage medium of claim 12, wherein
the determination by the hypervisor of the target number is based on a total demand for the plurality of virtual CPUs allocated to the virtual machine and on an expected utilization ratio for the virtual machine.

14. The non-transitory computer readable storage medium of claim 12, wherein the computer readable code configuring the hypervisor to determine the target number is further based on a number of virtual CPUs to the virtual machine is entitled and on an amount of ready time associated with the virtual machine.

15. The non-transitory computer readable storage medium of claim 9, wherein
the determination of the target number of virtual CPUs for the virtual machine is received from the hypervisor via a backdoor call.

16. A computer system, comprising:
a physical processor;
a virtual machine having a plurality of virtual processors, having a guest operating system executing thereon; and
a virtualization layer configured to manage sharing of the physical processor between the plurality of virtual processors for the virtual machine and determine a target number of virtual processors for the virtual machine,
wherein the guest operating system includes
a device driver configured to determine whether the target number of virtual processors received from the virtualization layer is less than a current number of virtual processors activated for the virtual machine, and responsive to a determination that the target number of virtual processors activated for the virtual machine is less than the current number of virtual processors, to (i) launch, in a guest operating system of the virtual machine, and for execution in a first virtual processor of the plurality of virtual processors, a prioritized process thread that includes a halt instruction, (ii) pin the prioritized process thread to the first virtual processor, to bind the prioritized process thread to the first virtual processor, and (iii) decrement the current number of virtual processors activated for the virtual machine, and a guest scheduler configured to execute the prioritized process thread using the first virtual processor of the plurality of virtual processors, wherein the virtualization layer is further configured to, responsive to detecting that the first virtual processor is executing the halt instruction, deactivate the first virtual processor from executing in the virtual machine by descheduling the first virtual processor from executing on the physical processor.

17. The computer system of claim 16, wherein the prioritized process thread is a kernel thread.

18. The computer system of claim 16, wherein the device driver is further configured to:

responsive to a determination that the target number of virtual processors is greater than the current number of virtual processors, kill execution of the prioritized process thread in the first virtual processor, wherein the virtualization layer is further configured to, responsive to determining that the first virtual processor is no longer executing the prioritized process thread, activate the first virtual processor.

19. The computer system of claim 16, wherein the virtualization layer is configured to determine the target number based on a current system load.

20. The computer system of claim 19, wherein: the virtualization layer is further configured to determine the target number based on a total demand for the plurality of virtual processors to which the virtual machine is entitled and on an expected utilization ratio for the virtual machine.

21. The computer system of claim 19, wherein the virtualization layer is further configured to determine the target number based on a number of virtual processors to which the virtual machine is entitled and on an amount of ready time associated with the virtual machine.

22. The computer system of claim 16, wherein the device driver is further configured to receive the target number of virtual processors from the virtualization layer via a backdoor call.

* * * * *